(12) United States Patent
Zhang et al.

(10) Patent No.: US 8,697,611 B2
(45) Date of Patent: Apr. 15, 2014

(54) HIGH DENSITY BRINES FOR USE IN WELLBORE FLUIDS

(75) Inventors: Hui Zhang, Sugar Land, TX (US); Robert L. Horton, Sugar Land, TX (US); Bethicia B. Prasek, The Woodlands, TX (US); Mary L. K. Dimataris, Houston, TX (US)

(73) Assignee: M-I L.L.C., Houston, TX (US)

( * ) Notice: Subject to any disclaimer, the term of this patent is extended or adjusted under 35 U.S.C. 154(b) by 63 days.

(21) Appl. No.: 11/792,797

(22) PCT Filed: Dec. 14, 2005

(86) PCT No.: PCT/US2005/045412
§ 371 (c)(1),
(2), (4) Date: Jun. 11, 2007

(87) PCT Pub. No.: WO2006/065990
PCT Pub. Date: Jun. 22, 2006

(65) Prior Publication Data
US 2008/0135302 A1 Jun. 12, 2008

Related U.S. Application Data

(60) Provisional application No. 60/311,729, filed on Aug. 10, 2001.

(51) Int. Cl.
*C09K 8/00* (2006.01)
*C09K 8/16* (2006.01)
*C09K 8/74* (2006.01)
*C23F 11/18* (2006.01)
*C09K 8/02* (2006.01)

(52) U.S. Cl.
USPC ........... 507/140; 507/141; 507/269; 507/270; 175/65; 175/70

(58) Field of Classification Search
USPC .............. 507/140, 141, 269, 270; 175/65, 70
See application file for complete search history.

(56) References Cited

U.S. PATENT DOCUMENTS

| | | | |
|---|---|---|---|
| 4,292,183 A * | 9/1981 | Sanders | 507/272 |
| 4,304,677 A | 12/1981 | Stauffer et al. | |
| 4,381,241 A * | 4/1983 | Romenesko et al. | 507/127 |
| 4,557,718 A | 12/1985 | Kamps et al. | |
| 4,980,074 A | 12/1990 | Henson et al. | |
| 5,328,035 A | 7/1994 | Duyvesteyn et al. | |
| 5,632,382 A * | 5/1997 | Patrick et al. | 209/173 |
| 6,004,475 A | 12/1999 | Verma et al. | |
| 6,004,476 A | 12/1999 | Verma et al. | |
| 6,620,341 B1 | 9/2003 | Verma et al. | |
| 7,273,832 B2 | 9/2007 | Benton et al. | |
| 2003/0114318 A1 * | 6/2003 | Benton et al. | 507/200 |
| 2004/0149431 A1 | 8/2004 | Wylie et al. | |

FOREIGN PATENT DOCUMENTS

| | | |
|---|---|---|
| RU | 2114889 | 7/1998 |
| WO | 9319849 A1 | 10/1993 |

OTHER PUBLICATIONS

Examination Report for European Application No. 11 157 578.3 dated Oct. 2, 2012.
Kepert, et al., "Comprehensive Inorganic Chemistry", Oxford: Pergamon Press, vol. 4, 1973, pp. 607-672.
Tsigdinos, G.A., "Heteropoly Compounds of Molybdenum and Tungsten", Topics in Current Chemistry, vol. 76, 1978, pp. 5-64.

* cited by examiner

*Primary Examiner* — Aiqun Li

(57) ABSTRACT

A composition and method for use in drilling or completing a subterranean well comprising a solidsfree, high-density brine composed of alkali metal polytungstate and blends thereof. These high-density brines are also useful as wellbore fluids and other non-oilfield fluids requiring high density properties.

12 Claims, No Drawings

HIGH DENSITY BRINES FOR USE IN WELLBORE FLUIDS

The use of sodium, potassium, and cesium tungstates in brine solutions are disclosed in a U.S. Provisional Patent Application No. 60/311,729, by William Benton filed Aug. 10, 2001, published as utility patent application, No. 20030114318, to make dense solutions; but at the higher concentrations the brines are caustic due to the manufacturing techniques. These brines are not stable when exposed to CO2 or other acidic materials, forming water insoluble compounds such as tungstic acid, W03, or polytungstic acids.

As a consequence, we created the idea of making a Lewis salt of tungstate and some Lewis base. The Lewis definition of acids and bases is the broadest definition, so any acid or base by less general definition is also a Lewis acid or base. Some conventional bases like sodium, potassium, and cesium hydroxide are also Lewis bases. The sodium, potassium, and cesium salts of phosphoric and silicic acids and triethanolamine, and the like are, also Lewis bases.

Our idea is to react the Lewis acids, sodium, potassium, or cesium tungstate with a Lewis base to obtain a Lewis salt that will make a dense brine with a pH that is 7 or higher so that additives will be more stable in the brines. The Lewis salt of the Lewis acid sodium tungstate and the Lewis base disodium hydrogen phosphate is already known and is termed a phosphotungstate compound. Similarly, the Lewis salt of the Lewis acid sodium tungstate and the Lewis base sodium hydrogen silicate is already known and is termed a silicotungstate compound. The phosphotungstates and silicotungstates make dense brines, and we think that other such Lewis salts will also make dense brines. The phosphotungstates and silicotungstates are sometimes termed, respectively, tungstophosphates and tungstosilicates. The addition of a complexing agent to these systems is optional.

Fluids, such as completion or drilling fluids, containing at least one alkali metal salt of a transition metal oxy-anion or polyoxy-anion, such as, for example, an alkali metal polytungstate are described. Methods of preparing a dense or heavy liquid comprising an aqueous solution of transition metal salts, such as, for example, polytungstate are also described, wherein the aqueous solution contains anionic moieties having the formula $[A^{n+}B_mO_k]^{x-}$, where (A) is selected from group IV elements, group V elements, transition metal elements and rare earth elements; (B) is one or more transition metal elements having an atomic weight between 50 and 201 inclusive, O is oxygen, m is an integer between 6 and 18 inclusive, k is an integer between 24 and 62 inclusive, and x is a small integer, typically between 1 and 10 depending on the selections of A, B, m, and k, said dense liquid also comprising in said aqueous solution cationic moieties capable of forming salts of said anionic moieties. The cation values may be lithium, sodium, potassium, cesium, or a mixture thereof, with a small amount of hydrogen cations provided by free acid anionic moieties. The most preferred anionic moiety is $[SiW_{12}O_{40}]^{-4}$. The atom designated (B) alternatively may be molybdenum, vanadium, niobium or tantalum. A drilling fluid or mud is also described wherein the drilling fluid contains at least one alkali metal polytungstate. The drilling fluid may be brine-based (also referred to as water-based) or may preferably further contain at least one emulsifier or surfactant and at least one hydrocarbon-based fluid. The various fluids of the present invention can contain other conventional ingredients such as, for example, viscosifiers, complexing agents, fluid loss control additives, pH buffers, corrosion inhibitors, and oxygen scavengers. The present invention permits the completion fluids to be essentially free of suspended solids due to the use of the soluble alkali metal polytungstate or heteropolytungstate, and permits the drilling fluids to be quite low in suspended solids because they derive most of their density from the dissolved alkali metal polytungstate or heteropolytungstate.

Unlike the teachings of the prior art, the present invention teaches the use of these aqueous solutions of transition metal salts, wherein the aqueous solution contains anionic moieties having the formula $[A^{n+}B_mO_k]^{x-}$, where the cations may be lithium, sodium, potassium, cesium, or a mixture thereof, or with a small amount of hydrogen cations provided by free acid anionic moieties, and especially where said salts are a major component of the solution and not merely an additive thereto. The present invention teaches, in particular, the sodium, potassium, and cesium salts of the heteropolytungstates and the blends of these salts with the heteropolytungstic acids. It has been observed that these salts are not readily water soluble, but surprisingly, we have developed methods to make brine containing potassium, sodium, and cesium salts of the heteropoly anions. The aqueous solutions in accordance with the present invention may further include optional halide salts as additives, such as, for example, LiCl, LiBr, LiI, NaCl, NaBr, NaI, KCl, KBr, KI, RbCl, RbBr, RbI, CsCl, CsBr, CsI, $MgCl_2$, $MgBr_2$, $CaCl_2$, $CaBr_2$, $SrCl_2$, $SrBr_2$, $ZnCl_2$, $ZnBr_2$, and mixtures thereof, and similar compounds which should be well known to those of skill in the art. In addition to developing methods to make said brines, we have further developed methods to adjust the true crystallization temperature (TCT) and water activity of said brines, to make the brines stable in the pH range 3-10. The TCT is also referred to as the Thermodynamic Crystallization Temperature to distinguish it from any phase transition producing a metastable solid rather than the thermodynamic equilibrium phase. By stating that the brines are stable, it should be noted that we have tested the ambient temperature and high temperature stability to 350° F. and have found the brines to be stable; and expect further high temperature stability, although higher temperatures have not yet been tested. We have found that these brines appear to be less toxic than zinc brines such as 20.5 $lb_m$/gal $ZnBr_2$ or 19.2 $lb_m$/gal $ZnBr_2/CaBr_2$ brines, and possess a relatively favorable environmental, health and safety profile. We find that we can offer these products in a variety of colors, therefore they may have use as an optical tracer or to make themselves useful for readily making displacement efficiency visible and apparent.

We have observed that these brines display high temperature stability to 350° F. and perhaps beyond, corrosion inhibition, complete compatibility with monovalent brines and magnesium chloride brines and some compatibility with calcium and zinc brines, the ability to buoyantly suspend solids, for example to prevent barite packing off, the ability to dissolve scale, the ability to deliver fluids of density up to 25 $lb_m$/gal, giving the potential for shipping the brines as extremely heavy brine concentrates and later diluting on location to the density needed.

We have observed that these brines can provide 19-$lb_m$/gal brines having surprisingly high water activities as compared to zinc brines or cesium formate brines of comparable density, making the brines in accordance with the present invention more useful than conventional brines as a base brine for brine-based drilling fluids (also known as water-based drilling fluids) and more useful than conventional brines as an internal phase in invert emulsion drilling fluids including oil-based drilling fluids and synthetic-based drilling fluids and ester-based drilling fluids.

'WARP Fluids Technology', which is a commercialized system of M-I, L.L.C., is a system of water based and oil based drilling and completion fluids that are weighted up with a high density weighting agent. The WARP particles impart a high density to the fluid and may be barite or other weighting agents that have been subjected to a proprietary process. The polytungstate or heteropolytungstate brines or blends of brines including a polytungstate or heteropolytungstate salt described in accordance with the present invention can provide a 13-$lb_m$/gal solids free base brine for use with WARP or any other micro-sized weight material to be used for much higher densities with the same or even higher water activities. The fluids formulated in this way may be used for a variety of applications that include: reservoir drilling fluids; casing pressure kill fluids; packer fluids; kill pills and barrier fluids; testing and perforating fluids; high density spacers and similar such fluids useful in the oil and gas drilling industry.

Polytungstate or heteropolytungstate brines or blends of brines comprising a polytungstate or heteropolytungstate salt described in accordance with the present invention have displayed solubility in and compatibility with polar organic solvents—making them useful in clean-up operations, etc., and also possibly useful in the form of a brine/glycol blend as a flow-line fluid or hydraulic fluid for deepwater applications, hydrate-inhibitive. One skilled in the art will appreciate that these brines will be relatively facile in recovery, reclamation, and reuse, making them relatively "environmentally friendly".

The present invention relates to the drilling industry and more particularly relates to the completion fluids used in the completion of a well for the recovery of hydrocarbons or other materials. Further, the present invention relates to drilling fluids used in drilling, such as the drilling of a well for the recovery of hydrocarbons or other materials. These fluids are advantageously applied in or in connection with drilling, drill-in, displacement, completion, hydraulic fracturing, work-over, packer fluid emplacement or maintenance, well treating, testing, or abandonment.

In drilling operations, drilling fluids are designed/formulated to serve several functions. These functions include acting as a lubricant to the drill bit to reduce wear and friction during drilling, to seal the formation surface by forming a filter cake, and to protect against blowouts by holding back formation pressures. In the drilling fluid, agents will be present to provide lubrication as well as weighting materials in order to achieve a density that is typically greater than that needed to balance or over-balance the surrounding pressure in the well bore. Typically, in many drilling operations, the drilling fluid can contain up to 50% by weight of a weighting material such as barite. Barite, also known as barium sulfate, and other alkaline earth metal sulfates are not easily dissolved and are not easily suspended in liquids. Thus, the removal of barite or other alkaline earth metal sulfates that may be present in drilling fluids can be a significant problem. Currently, in the industry, both water-based muds (WBMs) and invert emulsion muds, including oil-based muds (OBMs), are typically used. More commonly than OBMs, synthetic-based muds (SBMs) are also used in drilling operations. In drilling an oil or gas well, the use of hydrocarbon-based drilling fluids is greatly preferred because of the inherent advantages of having a hydrocarbon-based fluid as the external phase that is in contact with the formation. However, one severe disadvantage to a hydrocarbon-based drilling fluid is that weighting materials, such as barite, calcium carbonate, or hematite must be added to increase the density of the fluid. These weighting-material solids are capable of inducing formation damage to producing formations or plugging production equipment. Thus, there is a need to provide drilling fluids that are preferably solids free or have low solids content in order to avoid the above-mentioned disadvantages. Also, there is a need to provide better technology which can avoid the need for a well shut-in and to remove scaling deposits, such as alkaline earth metal sulfate buildup. Further, fluids in accordance with this invention are applicable to wells that are drilled to either recover hydrocarbons or injector wells used for pressure maintenance/retention in a reservoir and also to fluids used with other drilling applications such as tunneling. In all these cases, it is useful to retain optimum injection or production rates by first removing all remnants of the filter cake formed during the drilling of the well. Accordingly, the industry prefers to remove the filter cake from the well bore in order to optimize productivity. If the filter cake is not removed, the filter cake can block the pores that are part of the formation surface of the well bore which will interfere with the recovery of hydrocarbons. The removal of the filter cake can be even a more difficult problem when the drilling fluid contains barite as the weighting material.

Once drilling operations have been completed, the well is prepared for the completion operations whereby the mud used for drilling is often displaced by a completion fluid. There are numerous methods of completing a well, amongst which are open-hole completions, pre-drilled, liner, and gravel packed screened systems. Completion fluids are typically water-based clear fluids and are formulated to the same density as or slightly greater density than the mud used to drill the well in order to retain the hydraulic pressure on the well bore. The clear fluids are typically halide based brines or organic based brines such as the formate-based fluids. There are occasions when a completion fluid with density up to 19.0 $lb_m$/gal is required. Currently, there are two conventional choices commercially available in the oil industry for the said requirement—zinc bromide and cesium formate. Each of these two candidates has limitations. For example, zinc bromide is a priority pollutant and, as a result, cannot be used in some applications. Because cesium is rare, the cost of cesium formate is often prohibitive. There is an urgent need in the industry to develop new fluids that have high density, environmental compatibility, low crystallization temperature, good thermal stability, and reasonable cost.

Sodium metatungstate [$Na_6(H_2W_{12}O_{40}).3H_2O$] and ammonium metatungstate [$(NH_4)_6(H_2W_{12}O_{40}).3H_2O$] are known to display high solubility in water and other solvents. Sodium metatungstate is a salt of metatungstic acid. Metatungstic acid is a metatungstate ([$H_2W_{12}O_{40}$]$^{6-}$) and is one of a family of compounds known as the isopolytungstates. Isopolytungstates also include paratungstate-A ([$W_7O_{24}$]$^{6-}$), and paratungstate-B ([$W_{12}O_{41}$]$^{10-}$). The high solubility of metatungstates makes them useful, for example, as catalysts.

A use of sodium metatungstate and ammonium metatungstate, which use relies both on the high densities and solubilities of these compounds, is disclosed in U.S. Pat. No. 4,557,718. This patent discloses the use of metatungstate solutions for heavy media separation processes, as a low-toxicity substitute for bromoform and tetrabromoethylene. High concentrations of sodium metatungstate dissolved in water provides true solutions, as distinguished from solutions having finely divided solids suspended therein, having densities up to about 25.9 lbm/gal; however, sodium metatungstate has not been readily accepted by those users who need a heavy liquid for suspension purposes with a density of 23.4 $lb_m$/gal or more, because its solutions at these densities are too viscous at >28 cP, or more than 28 times the viscosity of water. Another disadvantage of sodium metatungstate brines are their lack of thermal stability above 140° F.

U.S. Pat. No. 5,328,035 disclosed a composition of matter comprising lithium metatungstate and processes for its production and use. Lithium metatungstate is produced by establishing an aqueous solution of lithium monotungstate. The lithium monotungstate solution is subjected to an ion exchange treatment to exchange between about 70% and 80% of the dissolved lithium ions with hydrogen ions to produce a dilute solution of lithium metatungstate. The dilute solution can be concentrated, and lithium metatungstate can be crystallized from the concentrated solution. Advantageously, the dilute solution is concentrated to provide a solution having a density greater than about 26.7 $lb_m$/gal. The inventors claim that the lithium metatungstate solutions have significantly lower viscosities than solutions of other metatungstate having approximately the same density.

U.S. Pat. No. 5,632,382 disclosed a heavy liquid for material separations comprising an aqueous solution of lithium and/or sodium salts of tungstosilicic acid. Tungstosilicic acid is one of a family of numerous heteropolytungstic acids that include species such as $[X^{n+}W_{12}O_{40}]^{(8-n)-}$, $[X^{n+}W_{11}O_{39}]^{(12-n)-}$, $[X^{2n+}W_{18}O_{62}]^{(16-2n)-}$, and $[X^{n+}W_6O_{24}]^{(12-n)-}$. For each of these species, $X^{n+}$ represents a positively charged hetero element. For the species $[X^{n+}W_{12}O_{40}]^{(8-n)-}$, it is known that X may represent phosphorus, arsenic, boron, silicon, germanium, zirconium, titanium, iron, zinc, cobalt, nickel, copper, other transition metal elements, and rare earth elements. As compared to isopoly acids, where the isopoly acids are those containing only tungsten, oxygen and hydrogen, (or only molybdenum, oxygen and hydrogen, or other transition metal or rare earth element, oxygen and hydrogen), and the heteropoly acids are those containing one or two other elements in addition to tungsten, oxygen and hydrogen (or in addition to molybdenum, oxygen and hydrogen, or other transition metal or rare earth element, oxygen and hydrogen). The lithium and sodium alpha-tungstosilicates, as described in U.S. Pat. No. 5,632,382, are those having the anion species $[SiW_{12}O_{40}]^{4-}$. Sodium alpha-tungstosilicate forms an aqueous solution having a maximum possible density of 22.87 $lb_m$/gal at 68° F.; however the solubility of the sodium salt is temperature dependent, the solubility and therefore the maximum attainable density increasing with increasing temperature. As temperatures rise in excess of 77° F., the solubility of the sodium salt is increased to the extent that the resultant solution reaches the required density of 23.4 lbm/gal in order to be suitable for use in mineral separations of the type as hereinbefore described. The lithium alpha-tungstosilicate forms an aqueous solution having a maximum possible density of 27.70 $lb_m$/gal at 77° F. The solubility of the lithium salt is not so temperature dependent as that of the sodium salt, with the consequence that the solubility of the lithium salt and therefore the maximum attainable density does not decrease as markedly with falling temperature as is the case with the sodium salt. Depending on the temperature and lithium/sodium ratio, densities in excess of 24.20 lbm/gal can be obtained. At a normal operating density of 23.78 $lb_m$/gal, the viscosity is less than 12 cP. In addition, the lithium and/or sodium tungstosilicate dense liquids are stable to heating up to 212° F., and so can be concentrated or recycled by boiling off the water, with little or no loss of tungstosilicates.

The solutions of lithium/sodium tungstosilicates (LST) are not significantly corrosive to the metals commonly encountered in the laboratory, nor to most minerals. This characteristic suggests that brines in accordance with the present invention should be less damaging to formations than some other conventional brines. A feature of LST is that it is soluble in both water and a number of common organic solvents such as ethanol and acetone. This allows organic solvents to be used to wash the LST free from the minerals, if desired. Sodium polytungstate cannot be washed free in this manner.

All of the desirable properties of a heavy liquid are present in aqueous solutions of these compounds: high density, low vapor pressure, low toxicity, low viscosity, good stability, lack of color, reasonable cost and ease of preparation/manufacture.

The three patents described above teach the potential application of iso-poly or hetero-poly tungstates in mineral or other separation processes.

U.S. Pat. No. 6,004,475 teaches alkali metal halide solutions (particularly lithium bromide brines), which are useful as thermal absorption fluids in refrigeration machines, containing heteropoly complex anions of transitional elements as a corrosion inhibition additive. A particularly preferred solution includes phosphomolybdate $[PMo_{12}O_{40}]^{-3}$ anions. U.S. Pat. No. 6,004,475 states that the solutions of the invention are more environmentally acceptable than lithium chromate, exhibiting comparable or even improved corrosion inhibition. Further, the heteropoly complex anions can exhibit improved solubility in alkali metal halide solutions as compared to lithium molybdate. U.S. Pat. No. 6,004,475 teaches heteropoly complex anions of transitional elements similar to those of the present invention, but only as additives to the alkali metal halide brines and not as a major component of the solution.

U.S. Pat. No. 6,620,341 relates generally to corrosion inhibitors, and in particular to corrosion inhibitors and processes of using the same to protect metal surfaces in oil and gas drilling and servicing systems. These corrosion inhibitors, for example a heteropoly complex anion of transition metal elements, are added to brines—aqueous solutions such as those of the halides of zinc, calcium, sodium, and other alkali elements. U.S. Pat. No. 6,620,341 teaches the heteropoly complex anion species only as additives to brine and does not teach the heteropoly complex anion species themselves as a main component of the brine.

Corrosion is recognized as a problem in the development of geoenergy sources, including oil and natural gas reserves, geothermal and geopressured systems. The corrosion problems are aggravated by the presence of acid gases such as hydrogen sulfide and carbon dioxide and by the co-production of brine solutions. For example, carbon steel is widely used in the construction of oil and gas wells in oilfields. While a useful material for such applications, carbon steel corrodes due to the presence of electrolytes and water in many servicing or completion fluids. In recent years, corrosion problems have become more severe as production from deeper, high pressure and high temperature wells has become more attractive, further compounded by the fact that deeper formations can have increased levels of acid gas fluids.

Additives can provide corrosion protection for metals used in oil and gas drilling systems, such as carbon steel. However, conventional additives do not always provide the desired degree of corrosion protection, particularly at higher temperatures and pressures.

For example, corrosion inhibitors used in oil and gas drilling operations have typically included organic compounds containing nitrogen, sulfur and/or phosphorous. These corrosion inhibitors protect metal surfaces at least in part by forming a protective film on the metal surface. Thus, an important consideration for corrosion protection in oil and gas drilling systems is how well the corrosion inhibitor is transported to the corroding surface within the oil or gas well system. Dispersibility of the inhibitor in completion fluids, such as brine solutions, also plays an important role in its corrosion protection performance. Many other factors, such as stability of the protective film and inhibitor concentration in the completion fluid, are also important to provide enhanced corrosion protection. Many current inhibitors, however, have limited stability, particularly at higher temperatures, or exhibit poor characteristics in the solution and therefore offer limited protection.

The present invention provides brine solutions useful in oil and gas well drilling systems and similar applications, for example, as completion fluids. In one aspect of this embodiment of the invention, the solutions include at least one heteropoly complex anion of transition metal elements as a corrosion inhibitor; however, corrosion inhibition is only a minor part of the present invention.

DESCRIPTION OF THE PREFERRED EMBODIMENTS

The present invention teaches fluids, such as completion or drilling fluids, containing at least one alkali metal salt of a transition metal oxy-anion or polyoxy-anion, such as, for example, an alkali metal polytungstate or an alkali metal heteropolytungstate. Methods of preparing a dense or heavy liquid comprising an aqueous solution of transition metal salts, such as, for example, polytungstate are also described, wherein the aqueous solution contains anionic moieties having the formula $[A^{n+}B_mO_k]^{x-}$, where (A) is selected from group IV elements, group V elements, transition metal elements, and rare earth elements; (B) is one or more transition metal elements having an atomic weight between 50 and 201 inclusive, O is oxygen, m is an integer between 6 and 18 inclusive, k is an integer between 24 and 62 inclusive, and x is a small integer, typically between 1 and 10 depending on the selections of A, B, m, and k, said dense liquid also comprising in said aqueous solution cationic moieties capable of forming salts of said anionic moieties. The cation values may be lithium, sodium, potassium, cesium, or a mixture thereof, or a mixture thereof with a small amount of hydrogen cations provided by free acid anionic moieties. The most preferred anionic moiety is $[SiW_{12}O_{40}]^{4-}$. The atom designated (B) alternatively may be molybdenum, vanadium, niobium or tantalum.

A drilling fluid or mud is also described wherein the drilling fluid contains at least one alkali metal polytungstate or one alkali metal heteropolytungstate. The drilling fluid preferably further contains at least one emulsifier or surfactant and an oleaginous fluid, thereby forming an invert emulsion.

An illustrative primary emulsifier should be present in sufficient concentration to stabilize the invert emulsion and preferably is selected from compounds including fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Blends of these materials as well as other emulsifiers can be used for this application, as well as combinations and mixtures of these and similar compounds that should be known to one of skill in the art.

The oleaginous fluid used for formulating the invert emulsion fluids are liquids and are more preferably a natural or synthetic oil and more preferably, the oleaginous fluid is selected from the group including diesel oil, mineral oil, such as paraffins, polyolefins (both alpha olefins, internal olefins either of which may be linear or branched), polydiorganosiloxanes, siloxanes or organo-siloxanes, esters of long chain fatty acids, and mixtures thereof. The concentration of the oleaginous fluid should be sufficient so that an invert emulsion forms and should be less than about 99% by volume of the invert emulsion. However, generally the amount of oleaginous fluid must be sufficient to form a stable emulsion when utilized as the continuous phase. In various embodiments, the amount of oleaginous fluid at least about 30 percent, preferably at least about 40 percent, and more preferably at least about 50 percent by volume of the total fluid. In one embodiment, the amount of oleaginous fluid is from about 30 to about 95 percent by volume and more preferably from about 40 to about 90 percent by volume of the invert emulsion fluid.

Both the invert emulsion fluids and water-based fluids of the present invention may further contain additional chemicals depending upon the end use of the fluid so long as they do not interfere with the functionality of the fluids (particularly the emulsion when using invert emulsion displacement fluids) described herein. For example, wetting agents, organophilic clays, viscosifiers, fluid loss control agents, surfactants, thinners, thinning agents and cleaning agents may be added to the fluid compositions of this invention for additional functional properties. The addition of such agents should be well known to one of ordinary skill in the art of formulating drilling fluids and muds. The various fluids of the present invention can contain other conventional ingredients such as, for example, weighting agents, viscosifiers, fluid loss control additives, pH buffers, corrosion inhibitors, and oxygen scavengers.

The present invention permits the completion fluids to be essentially free of suspended solids due to the use of the soluble alkali metal polytungstate, and the drilling fluids to be quite low in suspended solids because they derive most of their density from the dissolved alkali metal polytungstate or alkali metal heteropolytungstate.

Unlike the teachings of the prior art, the present invention teaches the use of these aqueous solutions of transition metal salts, wherein the aqueous solution contains anionic moieties having the formula $[A^{n+}B_mO_k]^{x-}$, where the cations may be lithium, sodium, potassium, cesium, or a mixture thereof, or with a small amount of hydrogen cations provided by free acid anionic moieties, and especially where said salts are a major component of the solution and not merely an additive thereto. The present invention teaches, in particular, the sodium, potassium, and cesium salts of the heteropolytungstates and the blends of these salts with the heteropolytungstic acids. It has been observed that only the sodium polytungstate salts are readily water soluble, but surprisingly, we have developed methods to make brine containing potassium, sodium, and cesium salts of the heteropoly anions. The aqueous solutions in accordance with the present invention may further include optional halide salts as additives, such as, for example, LiCl, LiBr, LiI, NaCl, NaBr, NaI, KCl, KBr, KI, RbCl, RbBr, RbI, CsCl, CsBr, CsI, $MgCl_2$, $MgBr_2$, $CaCl_2$, $CaBr_2$, $SrCl_2$, $SrBr_2$, $ZnCl_2$, $ZnBr_2$, and mixtures thereof.

Heavy liquid containing alkali metal salt of a transition metal polyoxy-anion, e.g. the sodium salt of heteropolytungstic acid (sodium tungstosilicate) can be prepared by dissolving the anhydrous or hydrated crystals of the salt in water at room temperature. Typically, a solution of 60% by weight of the solid in water gives 2.3 s.g. The exact amount of the solid will vary somewhat depending on the amount of water of crystallization present. The solution can also be prepared by neutralizing heteropoly acids with either hydroxide or carbonate of alkaline metal, and concentrating it to a desired density through evaporation. For instance, a 2.3 s.g. fluid of sodium tungstosilicate can be prepared as set out in the following description: Dissolve tungstosilicic acid in water to make 50%~55% by weight solution; adjust pH of this acidic solution by 30 wt % sodium hydroxide from pH less than one to pH 6; boil water out, which is about 30% by volume of the initial fluid, at approximately 101 to 104° C. to obtain 2.3 s.g.

The heteropoly complex anions of transition metal elements in the solution can be generally described as coordination-type salts and free acids with a complex and high molecular weight anion. The heteropoly complex anions include as a ligand or complexing agent at least one transition metal atom, such as Mo or W, which exhibits corrosion inhibiting properties in oil and gas drilling systems. The heteropoly anions normally contain 12 complexed transition metal atoms (such as Mo or W). Therefore, the dissolved heteropoly anions can provide a higher level of transition metal anions (Mo or W anions) in a solution, as compared to simple transition metal oxides, such as molybdates like lithium molybdate or tungstates like lithium tungstate. Another advantage of the heteropoly complex anions over the simple transition metal oxides, e.g. the solution of sodium tungstosilicate over the solution of sodium tungstate, is that the former is stable while the later is not. When the latter is exposed to $CO_2$, tungsten oxide ($WO_3$) forms quickly which is a water insoluble solid.

The liquids of the above transition metal polyoxy-anion metal salts can be mixed with solutions of other salts, such as but not limited to, transition metal salts, alkali metal salts, alkaline earth metal salts, and mixtures thereof, to prepare completion or drilling brines. Exemplary salts include halides of zinc, calcium, and mixtures thereof. For example, the solution can include zinc halide, such as zinc bromide or zinc chloride or both. The brine solution can include the salts in conventional amounts, generally ranging from about 0% to about 50%, and preferably from about 1% to about 20%, based on the total weight of the solution, although as the skilled artisan will appreciate, amounts outside of this range can be used as well. Particularly preferred for use in the present invention—because the halides of calcium and zinc are so commonly used in the petroleum industry around the world—are solutions that include one or more halides of zinc and one or more halides of calcium, and more preferably zinc bromide, with or without zinc chloride, and calcium bromide, with or without calcium chloride. Such solutions can include about 1 to about 20 percent by weight zinc bromide; about 1 to about 10 percent by weight calcium bromide; about 0 to about 10 percent by weight zinc chloride and/or calcium chloride; and remainder mostly water. The liquids containing alkali metal salt of a transition metal polyoxy-anion of this invention can be mixed with the solution of sodium chloride, sodium bromide, and magnesium chloride at any desired ratios.

A variety of densities of the fluids of the present invention can be achieved with the present invention, for instance, from 1.0 s.g. up to about 3.0 s.g. Blending alkali metal salts or alkaline earth metal salts to a mainly hetero-poly anion based solution can further improve the thermal stability and lower the crystallization propensity of the base fluid. For example, the solution of sodium tungstosilicate of 1.33 s.g., 1.68 s.g., 2.31 s.g., and 2.71 s.g. density has True Crystallization Temperature of 36.4° F., 35.6° F. 23.0° F. and 18.1° F. respectively, blending 5% magnesium chloride while a sodium tungstosilicate-magnesium chloride blend (approximately 5 to 10 wt % magnesium chloride) with the same density has a crystallization temperature of about 15 to 5 degree lower.

These hetero-poly anion based brines can provide 2.3 s.g. (19-$lb_m$/gal) brines having higher water activities as compared to zinc brines or cesium formate brines of comparable density, making the brines in accordance with the present invention more useful than conventional brines as a base brine for brine-based drilling fluids (also known as water-based drilling fluids) and more useful than conventional brines as an internal phase in invert emulsion drilling fluids including oil-based drilling fluids and synthetic-based drilling fluids and ester-based drilling fluids. Having higher water activity, the brines are more easily viscosified than conventional brines.

These polytungstate brines and blends thereof, are useful as other wellbore fluids, including but not limited to hole cleaning fluids and sweeps, fluid loss control pills, lost circulation pills, spotting fluids and sweeps, packer fluids, fracture fluids, insulating annular fluids, mitigating sustained casing pressure buildup fluids, breaker fluids or acid pills or kill pills. The brine may also be utilized to emplace any of these specialized fluids with the well bore.

Also, the brines in accordance with the present invention will display solubility in and compatibility with polar organic solvents—making them useful in clean-up operations, and also possibly useful in the form of a brine/glycol blend as a flow-line fluid or hydraulic fluid for deepwater applications, i.e., hydrate-inhibitive. These brines will be relatively facile in recovery, reclamation, and reuse, making them relatively "environmentally friendly".

The present invention will be described more fully hereinafter in connection with illustrative embodiments of the invention which are given so that the present disclosure will be thorough and complete and will fully convey the scope of the invention to those skilled in the art. However, it is to be understood that this invention may be embodied in many different forms and should not be construed as being limited to the specific embodiments described and illustrated herein. Although specific terms are used in the following description, these terms are merely for purposes of illustration and are not intended to define or limit the scope of the invention.

One aspect of the present invention is that the same brines may be used to reduce the corrosive effects of brines upon metals, and is particularly useful for brines having a high concentration of metal halides, such as zinc halide, often used in oil and gas well drilling, completion, and work-over. Metals which typically come into contact with the brines include iron, steel (including carbon steel) and other ferrous metals.

The solutions of the invention include any solution useful in oil and gas well drilling systems and in similar applications, such as solutions used in drilling, producing and storing oil and gas from subterranean earth formations. The solutions typically contain metal salts, such as but not limited to, transition metal salts, alkali metal salts, alkaline earth metal salts, and mixtures thereof. Exemplary salts include halides of zinc, calcium, and mixtures thereof. For example, the solution can include zinc halide, such as zinc bromide or zinc chloride or both, optionally in combination with calcium bromide or calcium chloride or both. The brine solution can include the salts in conventional amounts, generally ranging from about 1% to about 50%, and preferably from about 1% to 20% based on the total weight of the solution, although as the skilled artisan will appreciate, amounts outside of this range can be used as well.

Particularly preferred for use in the present invention—because the halides of calcium and zinc are so commonly used in the petroleum industry around the world—are solutions that include one or more halides of zinc and one or more halides of calcium, and more preferably zinc bromide, with or without zinc chloride, and calcium bromide, with or without calcium chloride. Such solutions can include about 1 to about 20 percent by weight zinc bromide; about 1 to about 10 percent by weight calcium bromide; about 0 to about 10 percent by weight zinc chloride and/or calcium chloride; and remainder water. The liquids containing alkali metal salt of a transition metal polyoxy-anion of this invention can be mixed with the solution of sodium chloride, sodium bromide, and magnesium chloride at any desired ratios. For reference to exemplary solutions useful in oil and gas well drilling applications, and particularly deep high temperature and high pressure wells, see U.S. Pat. Nos. 4,980,074, 4,304,677 and 4,292,183, the entire disclosure of each of which is hereby incorporated in its entirety by reference.

The heteropoly complex anions of transition metal elements can be generally described as coordination-type salts and free acids with a complex and high molecular weight anion. The heteropoly complex anions include as a ligand or complexing agent at least one transition metal atom which, as an ion in solution, exhibits corrosion inhibiting properties in oil and gas drilling systems. The heteropoly complex anions useful in the solutions of the invention also are preferably substantially completely soluble in brine solutions, so as to maximize the concentration of the corrosion inhibiting ions in solution. The heteropoly anions contain complexed transition metal atoms (such as Mo or W). Therefore, the dissolved heteropoly anions can provide a higher level of transition metal anions (Mo or W anions) in a solution, as compared to simple transition metal oxides, such as molybdates like lithium molybdate or tungstates like lithium tungstate.

Any of the heteropoly complex anions known in the art can be used in the invention, including compounds described in U.S. patent application Ser. No. 08/876,126, filed Jun. 23, 1997, now U.S. Pat. No. 6,004,475, issued Dec. 21, 1999, the entire disclosure of which is incorporated herein by reference. Such complexes can be generally represented by the following formulas:

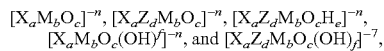

wherein: X and Z are central heteroatoms from Groups I-VII of the Periodic Table of Elements; the value of a varies and is 1 or 2; the value of d varies and is an integer from 0 to 4;

$M_bO_e$, $M_bO_cH_e$, and $M_bO_c(OH)_f$ are oxoanions in which M is a transition metal element; the value of b varies, depending upon the number of transition metal atoms present in the oxoanion and can be an integer from 5 to 22, preferably 6 to 12; the value of c varies, depending upon the number of oxygen atoms present in the oxoanion attached to the transition metal and also capable of forming unique structural groups with the central atoms, and is an integer from 20 to 70, preferably from 24 to 40; the value of e varies (for example in the reduced heteropolyanion, the value of e varies depending upon the reduction of the heteropolyanion) and is an integer from 0 to 6; and the value of f varies and is an integer from 0 to 3; and n is the charge of the anion and is the sum of the charges on X, Z, M, O, H, and OH.

Although the above formulas are general representations of the heteropoly complex anions useful in the invention, as will be appreciated by the skilled artisan, other compounds can also be included. Also as these formulas represent, in some heteropoly complex anions, H atoms in addition to the O atoms have been reported. Any of the various heteropoly complex anions known in the art can be used in the invention, including compounds described by G. A. Tsigdinos, Topics Curr. Chem., vol. 76, 5-64 (1978) and D. L. Kepert, Comprehensive Inorganic Chemistry (A. F. Trofman, et al.) Oxford: Pergamon Press, vol. 4, pp. 607 (1973), the entire disclosure of each of which is incorporated herein by reference.

With regard to the central or heteroatom X, over 40 different elements (both metals and nonmetals) from Periodic Groups I-VIII can function as central atoms in distinct heteropoly complex anions. For example, X can be an elements selected from Groups IVB, VB, VIB, VIIB, VIII, IB, IIB, IIIA, IVA, and VA of the Periodic Table of Elements. Exemplary central atoms include, but are not limited to, ions of phosphorus, silicon, manganese, arsenic, boron, iron, tellurium, copper, zinc, aluminum, tin, zirconium, titanium, vanadium, antimony, bismuth, chromium, gallium, germanium, and the like.

M is a transition metal atom which, with its associated oxygen atoms, surrounds one or more central atoms X so that some of the oxygen atoms are associated with both M and X. The transition metal atom M is selected from those elements which as ions in solution provide corrosion inhibiting effect in oil and gas drilling systems. Preferably the transition metal element M in the oxoanion is derived from molybdate or tungstate. Other transition metal elements can also be present, as represented in the formula as Z, such as but not limited to, an element selected from Groups IVB, VB, VIB, VIIB, VIII, IB, IIB, IIIA, IVA, and VA of the Periodic Table of Elements. Exemplary elements include without limitation manganese, cobalt, nickel, copper, zinc, vanadium, niobium, tantalum, gallium, germanium, arsenic, antimony, bismuth, tellurium, and the like and other transition elements.

Exemplary heteropoly complex anions include, but are not limited to, phosphomolybdates, such as but not limited to, $[PMo_{12}O_{40}]^{-3}$, wherein $P^{+5}$ is the central atom or heteroatom, $[PMo_{10}V_2O_{40}]^{-5}$ and the like; silicon molybdates, such as but not limited to, $[SiMo_{11}NiO_{40}H_2]^{-6}$, wherein $Si^{+4}$ is the central atom; manganese molybdates, such as but not limited to, $[MnMo_9O_{32}]^{-6}$, wherein $Mn^{+4}$ is the central atom; silicon tungstates, such as but not limited to, $[SiW_{12}O_{40}]^4$, wherein $Si^{+4}$ is the central atom; tellurium molybdates, such as but not limited to, $[TeMo_6O_{24}]^{-6}$, wherein $Te^{+6}$ is the central atom; arsenic molybdates, such as but not limited to, $[As_2Mo_{18}O_{62}]^{-6}$, wherein $As^{+5}$ is the central atom; manganese niobiates, such as but not limited to, $[MnNb_{12}O^{36}]^{-12}$, wherein $Mn^{+4}$ is the central atom; and the like, and mixtures thereof. Preferred heteropoly complex anions are silicomolybdates, phosphomolybdates, silicotungstates, and phosphotungstates, or blends thereof with silicomolybdic acids, phosphomolybdic acids, silicotungstic acids, or phosphotungstic acids.

The heteropoly complex anions which have been structurally characterized can be divided into the broad groups, depending upon the heteroatom [X], transition metal atom [M] stoichiometry, and depending upon the coordination number of the heteroatom (that is, the number of points at which M is attached to the heteroatom in the complex). The heteropoly complex anions can be classified according to the ratio of the number of the central atoms to the peripheral molybdenum or other such atoms. For example, the different types of known heteropoly complex anions of molybdate show the following X:M ratio with one or more central atoms: X:M=1:12, 1:11, 1:10, 1:9, 1:6, 2:10, 2:17, 2:5, 4:12, 1 m:6 m (m unknown) and 1:1 heteropoly complex anions. The known tungstates include all of the above in addition to 2:18, 2:17 and 2:4:18.

In a preferred embodiment of the invention, the transition metal of the heteropoly complex anion is molybdenum or tungsten, and more preferably, molybdenum. A particularly preferred solution includes one or more of the heteropoly complex anions, $[PMo_{12}O_{30}]^{-3}$, $[PW_{12}O_{30}]^{-3}$, $[SiMo_{12}O_{40}]^{-4}$, and $[SiW_{12}O_{40}]^{-4}$.

The solutions of the invention can also include one or more additional corrosion inhibiting additives or agents in combination with the heteropoly complex anion. For example, the solution can include another transition metal additive having corrosion inhibiting properties. Generally the corrosion inhibiting transition metal additive is a transition metal salt that is different from the transition metal salts such as the zinc halides described above. Useful transition metal additives having corrosion inhibiting properties include compounds capable of providing the transition metal element as ions in aqueous brine solutions for complexing with the chosen heteropoly anion. The transition metal element of the transition metal additive can be the same or different from the transition metal of the heteropoly anion complex. Exemplary transition metal additives include nitrates, halides, oxides, and the like, preferably halides, of transition metal elements such as cobalt, nickel, tungsten, zirconium, manganese, chromium, and the like. The solutions of the invention can also include mixtures of such corrosion inhibiting transition metal additives. See U.S. Pat. No. 6,004,476, issued Dec. 21, 1999, the entire disclosure of which is hereby incorporated by reference.

Other additional corrosion inhibiting additives useful alone or in combination with the heteropoly complex anion include corrosion inhibiting compounds of the metallic elements of Groups IIIa to VIa of the Periodic Table of Elements. Such compounds are also selected from compounds capable of providing the metallic elements of Group IIIa to VIa as ions in brine solutions. Exemplary compounds of the metallic elements of Groups IIIa to VIa include oxides, sulfides, halides, nitrates, and the like, preferably halides, of metallic elements of Group IIIa to VIa, such as antimony, germanium, and the like. See U.S. Pat. No. 6,004,476, noted above.

Further, the solution can include other corrosion inhibitors, such as but not limited to lithium nitrate, molybdate and/or chromate in conventional amounts. Other agents conventionally found in completion fluids can also be present such as but not limited to bactericides, scale preventives, algaecides, emulsifiers, demulsifiers, water and other solvents or diluents, e.g., hydrocarbons, alcohols, and the like.

In the present invention, we describe fluids containing alkali metal polytungstates and their use in completion fluids, drilling fluids, and other fluids associated with drilling of oil and gas wells and associated technologies—displacement, completion, hydraulic fracturing, work-over, packer fluid emplacement or maintenance, well treating, testing, or abandonment. For instance, the present invention relates to compositions capable of dissolving or solubilizing scaling deposits, which can include alkaline earth metal sulfates, which are present on surfaces, such as well bores.

U.S. Pat. No. 6,620,341 disclosed that heteropoly complex anions of transitional metal elements, such as silicon tungstates, can be added to an oil well drilling solution to minimize corrosion of systems within which the solution is used. Therefore, corrosion inhibition may well be one of the benefits of using fluids of the current invention in drilling and completion.

Whereas, for example, U.S. Pat. No. 6,620,341 disclosed that heteropoly complex anions of transitional metal elements can be additives to drilling fluids, the present invention teaches the use of these aqueous solutions of transition metal salts especially where said salts are a major component of the solution and not merely an additive thereto. The present invention teaches, in particular, the sodium, potassium, and cesium salts of the heteropolytungstates and the blends of these salts with the heteropolytungstic acids.

It has been observed that only the sodium salts are readily water soluble, but surprisingly, we have developed methods to make brine containing potassium, sodium, and cesium salts of the heteropoly anions.

The aqueous solutions in accordance with the present invention may further include optional halide salts as additives, such as, for example, LiCl, LiBr, LiI, NaCl, NaBr, NaI, KCl, KBr, KI, RbCl, RbBr, RbI, CsCl, CsBr, CsI, $MgCl_2$, $MgBr_2$, $CaCl_2$, $CaBr_2$, $SrCl_2$, $SrBr_2$, $ZnCl_2$, $ZnBr_2$, and mixtures thereof.

In addition to developing methods to make said brines, we have further developed methods to adjust the TCT and water activity of said brines, to make the brines stable in the pH range 3-10, more preferably from 4 to 8. By stating that the brines are stable, it should be noted that we have tested the ambient temperature and high temperature stability to 350° F. and have found the brines to be stable, although higher temperatures have not yet been tested.

We have found that these brines appear to be less toxic than zinc brines such as 20.5 $lb_m$/gal ZnBr2 or 19.2 $lb_m$/gal $ZnBr_2$/$CaBr_2$ brines, and possess a relatively favorable environmental, health and safety profile.

We find that we can offer these products in variety of colors, suggesting that they may have use as an optical tracer or to make themselves useful for readily making displacement efficiency visible and apparent. We find that this brine can be also be colorless, suggesting that is might be used as an optical fluid for downhole video, photography or other optical activities.

We have observed that these brines display high temperature stability at 350° F. and expect the temperature stability will extend beyond. We have observed further that these brines display corrosion inhibition, complete compatibility with monovalent brines and some compatibility with calcium, zinc, and magnesium brines, the ability to buoyantly suspend solids, for example to prevent barite packing off, the ability to dissolve scale, the ability to deliver fluids of density up to 25 $lb_m$/gal, giving the potential for shipping the brines as extremely heavy brine concentrates and later diluting on location to the density needed there. We observed that these brines can provide 19-lbm/gal brines having surprisingly high water activities as compared to zinc brines or cesium formate brines of comparable density, making the brines in accordance with the present invention more useful as an internal phase in invert emulsion drilling fluids including oil-based drilling fluids and synthetic-based drilling fluids and ester-based drilling fluids.

One skilled in the art will appreciate that these brines can provide, a 13-$lb_m$/gal base brine for WARP (coated, micro-sized barite)—allowing WARP, or any other micro-sized weight material to be used for much higher densities with the same or even higher water activities. Currently we are using NaCl-brine as the base fluid for WARP at approximately 9-$lb_m$/gal density.

We have observed that these brines will display solubility in and compatibility with polar organic solvents—making them useful in clean-up operations, etc., and also possibly useful in the form of a brine/glycol blend as a flow-line fluid or hydraulic fluid for deepwater applications, i.e., hydrate-inhibitive.

One skilled in the art will appreciate that these brines will be relatively facile in recovery, reclamation, and reuse, making them relatively "environmentally friendly".

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. A drilling fluid comprising a stable invert emulsion of an oleaginous fluid; a solids-free brine that provides a density of 1.33 s.g. up to 25 lb/gal (3.0 s.g.) comprising water and one or more alkali metal salts of a transition metal oxy-anion or polyoxy-anion as the majority components of the brine other than water; and an emulsifier, wherein the transition metal oxy-anion or polyoxy-anion is selected from a group consisting of polytungstate, heteropolytungstate, or a combination thereof.

2. The drilling fluid of claim 1 further comprising a halide-based brine, wherein the halide based brine is an alkali metal or alkaline earth metal halide brine.

3. The drilling fluid of claim 1, wherein the alkali metal of the alkali metal polytungstate or the alkali metal heteropolytungstate is selected from the group consisting of lithium, sodium, potassium, cesium, or a mixture thereof.

4. The drilling fluid of claim 1, wherein the transition metal oxy-anion or polyoxy anion is $[PW_{12}O_{30}]^{-3}$ and $[SiW_{12}O_{40}]^{-4}$.

5. The drilling fluid of claim 1, wherein the oleaginous fluid is selected from the group consisting of diesel oil, mineral oil, paraffins, polyolefins, polydiorganosiloxanes, siloxanes or organo-siloxanes, esters of long chain fatty acids, and mixtures thereof.

6. The drilling fluid of claim 1, further comprising an halide salt selected from the group consisting LiCl, LiBr, LiI, NaCl, NaBr, NaI, KCl, KBr, KI, RbCl, RbBr, RbI, CsCl, CsBr, CsI, $MgCl.sub.2$, $MgBr_2$, $CaCl_2$, $CaBr_2$, $SrCl_2$, $SrBr_2$, $ZnCl_2$, $ZnBr_2$, and mixtures thereof.

7. A method of drilling a subterranean well, comprising utilizing a drilling fluid wherein the drilling fluid is a stable invert emulsion formulated to include a brine phase as the discontinuous phase of the drilling fluid and an oleaginous fluid as the continuous phase, wherein the brine phase includes water and at least one alkali metal salt of a transition metal oxy-anion or polyoxy-anion and circulating the drilling fluid in the subterranean well; wherein the brine phase has a density of at least 1.33 s.g. and the alkali metal salts of a transition metal oxy-anion or polyoxy-anion are the majority components of the brine phase other than water; and wherein the transition metal oxy-anion or polyoxy-anion is selected from a group consisting of polytungstate, heteropolytungstate, or a combination thereof.

8. The method claim 7, wherein the alkali metal of the alkali metal polytungstate or the alkali metal heteropolytungstate is selected from the group consisting of lithium, sodium, potassium, cesium, or a mixture thereof.

9. The method of claim 7, wherein the oleaginous fluid is selected from the group consisting of diesel oil, mineral oil, paraffins, polyolefins, polydiorganosiloxanes, siloxanes or organo-siloxanes, esters of long chain fatty acids, and mixtures thereof.

10. A method of drilling a subterranean well comprising formulating a drilling fluid wherein the drilling fluid includes a stable invert emulsion of a brine phase having a density of at least 1.33 s.g. as the continuous phase and wherein the brine phase includes water and at least one alkali metal salt of a polytungstate or an alkali metal salt of a heteropolytungstate and the alkali metal is selected from the group consisting of lithium, sodium, potassium, cesium, or a mixture thereof as the majority components of the brine phase other than water.

11. The drilling fluid of clam 1, wherein the alkali metal of the alkali metal polytungstate or the alkali metal heteropolytungstate comprises potassium.

12. The drilling fluid of claim 7, wherein the alkali metal of the alkali metal polytungstate of the alkali metal heteropolytungstate comprises potassium.

* * * * *